United States Patent
Novek

(10) Patent No.: US 11,118,846 B2
(45) Date of Patent: Sep. 14, 2021

(54) POWER GENERATION USING ICE OR OTHER FROZEN FLUIDS AS A HEAT SOURCE

(71) Applicant: INNOVATOR ENERGY, LLC, Princeton, NJ (US)

(72) Inventor: Ethan J. Novek, Princeton, NJ (US)

(73) Assignee: Innovator Energy, LLC, Princeton, NJ (US)

( * ) Notice: Subject to any disclaimer, the term of this patent is extended or adjusted under 35 U.S.C. 154(b) by 0 days.

(21) Appl. No.: 17/146,833

(22) Filed: Jan. 12, 2021

(65) Prior Publication Data

US 2021/0222960 A1    Jul. 22, 2021

Related U.S. Application Data

(60) Provisional application No. 62/961,966, filed on Jan. 16, 2020.

(51) Int. Cl.
| | |
|---|---|
| F28D 20/02 | (2006.01) |
| F03G 7/05 | (2006.01) |
| F03G 7/00 | (2006.01) |
| F28C 3/08 | (2006.01) |
| F28C 1/00 | (2006.01) |
| F01K 27/00 | (2006.01) |

(Continued)

(52) U.S. Cl.
CPC ............ *F28D 20/025* (2013.01); *F01K 27/00* (2013.01); *F03D 9/37* (2016.05); *F03D 9/41* (2016.05); *F03G 7/00* (2013.01); *F03G 7/05* (2013.01); *F28C 1/00* (2013.01); *F28C 3/08* (2013.01); *Y02E 40/00* (2013.01); *Y02E 70/30* (2013.01)

(58) Field of Classification Search
CPC . F28D 20/025; F03D 9/37; F03D 9/41; F01K 27/00; F28C 1/00; F28C 3/08; F03G 7/00; F03G 7/05; Y02E 40/00; Y02E 70/30
USPC .......................................... 60/650, 682–684
See application file for complete search history.

(56) References Cited

U.S. PATENT DOCUMENTS

| | | | |
|---|---|---|---|
| 5,810,249 A | 9/1998 | Nilsson | |
| 5,983,634 A * | 11/1999 | Drucker | ................. H02S 10/12 60/398 |

(Continued)

FOREIGN PATENT DOCUMENTS

WO    1980001301 A1    6/1980

OTHER PUBLICATIONS

Kharseh, "Utilize freezing water to generate energy", SN Appl. Sci. 1, 127 (2019).

(Continued)

*Primary Examiner* — Hoang M Nguyen
(74) *Attorney, Agent, or Firm* — Gregory L. Porter; Hunton Andrews Kurth LLP

(57) ABSTRACT

The present application pertains to novel methods to generate power. In a representative embodiment, power is generated by warming a body of air having a temperature lower than the freezing point of liquid water by contacting the body of air with liquid water. The liquid water has a temperature greater than the freezing point of liquid water. Liquid water freezes thereby generating latent heat from freezing and thereby warming the body of air. The warmed body of air may be passed through an air turbine to generate power. Other methods and systems are described that use similar principles.

28 Claims, 5 Drawing Sheets

(51) Int. Cl.
    *F03D 9/41*          (2016.01)
    *F03D 9/37*          (2016.01)

(56) References Cited

U.S. PATENT DOCUMENTS

| | | | | |
|---|---|---|---|---|
| 6,532,740 | B1* | 3/2003 | Sullivan | F03G 6/064 |
| | | | | 60/641.11 |
| 7,757,490 | B2* | 7/2010 | Kenessey | F03G 6/045 |
| | | | | 60/641.12 |
| 2010/0176602 | A1* | 7/2010 | Shinnar | F28D 20/0056 |
| | | | | 290/1 A |
| 2012/0240576 | A1* | 9/2012 | Johnson | F28D 15/0266 |
| | | | | 60/641.6 |
| 2013/0036735 | A1 | 2/2013 | Sankrithi | |
| 2014/0174080 | A1 | 6/2014 | Friesth | |
| 2017/0250626 | A1* | 8/2017 | Barlot | H02N 2/18 |

OTHER PUBLICATIONS

Kharseh et al., "The Icy Rider: A Vehicle Driven by Freezing Water", vol. 6, Issue 1, Int'l J. Adv. Res. in Engi. & Tech. (Jan. 2015), pp. 115-120.
International Search Report & Written Opinion (PCT/US2021/013063), dated Apr. 1, 2021.

* cited by examiner

POWER GENERATION USING ICE OR OTHER FROZEN FLUIDS AS A HEAT SOURCE

CROSS-REFERENCE TO RELATED APPLICATIONS

The present application claims priority to U.S. provisional application 62/961,966 filed Jan. 16, 2020 which application is incorporated herein by reference.

FIELD OF THE INVENTION

The present application pertains to methods and systems to generate power using, for example, the enthalpy of freezing.

BACKGROUND AND SUMMARY OF THE INVENTION

With the need to decreasing dependence on traditional fossil fuels there is a need for new methods and systems of generating power. It would be advantageous if such new methods and systems were ecofriendly and used abundant renewable resources with a reduced carbon footprint. Advantageously, the methods and systems described herein accomplish at least one or more of the aforementioned needs and may have additional advantages.

In one embodiment, the application pertains to a process for generating power. The process involves warming a body of air having a temperature lower than the freezing point of water by contacting said body of air with liquid water having a temperature greater than or equal to the freezing point of the liquid water. The contacting occurs under conditions such that liquid water freezes thereby generating latent heat from freezing and thereby warming the body of air. The body of air is within a substantially vertical tower such that the warming the body of air causes the body of air to rise and pass through an air turbine. Power is generated from the body of air passing through the air turbine.

In another embodiment, the application pertains to a process for generating power. The process involves warming a body of air having a temperature lower than 0° C. by contacting said body of air with liquid water having a temperature greater than or equal to the freezing point of the water under conditions such that liquid water freezes thereby generating latent heat from freezing and thereby warming the body of air. The warmed body of air is passed through an air turbine and power is generated.

In another embodiment, the application pertains to a process for generating power. The process involves passing a body of air having a temperature lower than 0° C. through an air turbine. The body of air having a temperature lower than 0° C. is contacted with liquid water having a temperature greater than or equal to the freezing point of the water under conditions such that liquid water freezes thereby generating latent heat from freezing and thereby warming the body of air. Power is generated from passing the warmed body of air passing through the air turbine.

In another embodiment, the application pertains to a process for generating power. The process involves contacting a body of air with a liquid having a freezing point under conditions such that the liquid freezes thereby generating latent heat from freezing and thereby warming the body of air. The body of air is at a temperature less than the freezing point of the liquid prior to contacting. The warmed body of air is passed through an air turbine to generate power.

DETAILED DESCRIPTION

Figure 1:
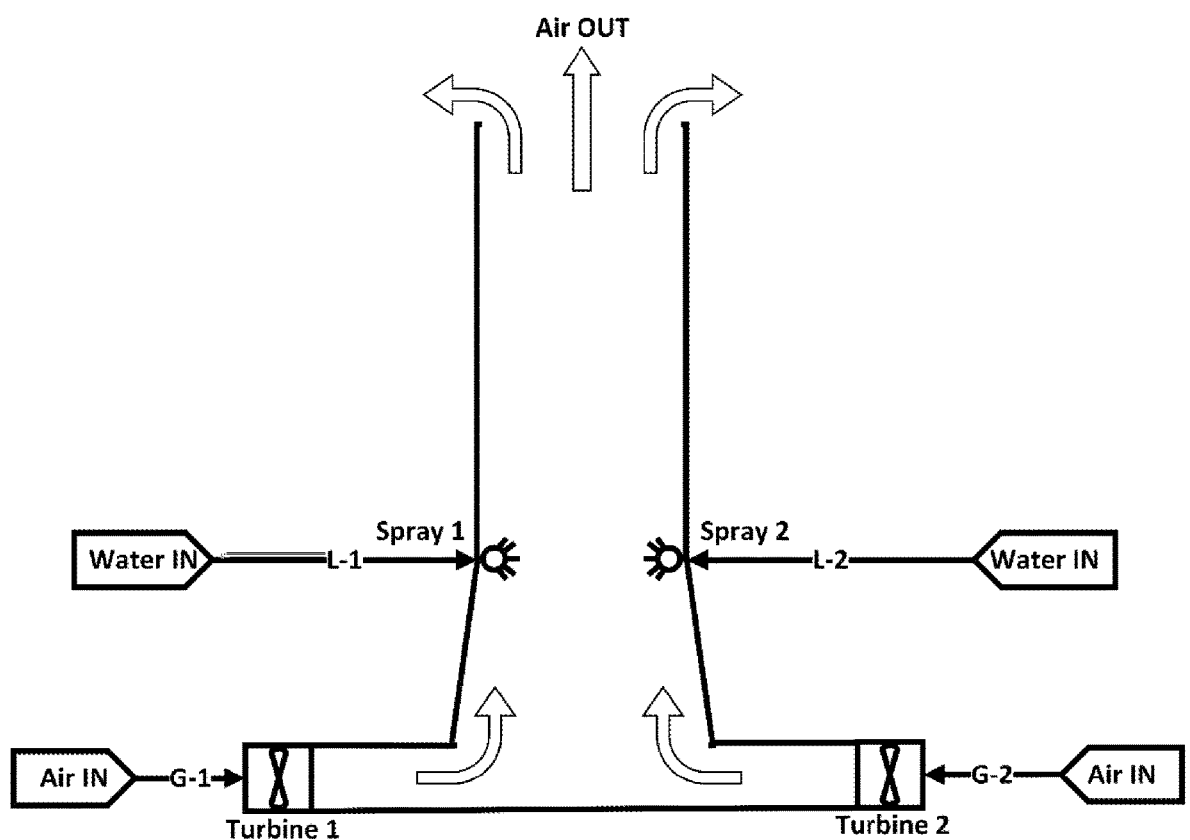
FIG. 1 shows an embodiment comprising a tower configured to generate power from the enthalpy of freezing of liquid water.

The enthalpy of freezing of water is a tremendous heat source which is abundant and underappreciated. Even some of the coldest parts of the world, where air temperatures are consistently significantly below the freezing point of water, abundant volumes of liquid water are present. In areas where oceans, lakes, and other water bodies are covered with ice, liquid water generally exists in significant abundance below the ice.

Artic ice in the winter time is generally 2 to 3 meters thick, with 4 to 5 meters thick ice in extreme cases. In the North Pole, sea ice is generally 2 to 3 meters thick, yet liquid water depths beneath the sea ice at the North Pole are greater than 4,000 meters deep.

Advantageously, unlike other underexploited water body or ocean energy sources (for example: tidal, waves, ocean thermal energy conversion from thermoclines), the present resource can be exploited while benefiting the environment and earth's climate systems. Presently, ocean/sea ice is melting at greater rates, causing ocean water levels to rise, the release of methane and other GHGs trapped in the melting ice, and a loss of habitat for marine animals. Exploiting the present energy source involves freezing liquid water into ice and, if desired, returning said ice to the environment (for example: placing ice back in the water body it originated from). This means the present energy source may have two simultaneous benefits to the environment—1) generating 100% clean renewable electricity; and 2) generating more sea ice (or lake ice), which may increase the amount of ice in the ocean and may reduce or inhibit the problematic excessive melting of ice caused by global climate change.

In freshwater, the freezing point or enthalpy of fusion is about 0 degrees C. In ocean water, the freezing point or enthalpy of fusion is about −2 degrees C. In large portions of the world, liquid water is in close proximity to or in contact with air temperatures substantially below the freezing temperature of water, for example, less than −5° C., or less than −10° C., or less than −15° C., or less than −20° C., or less than −25° C., or less than −30° C., or less than −40° C., or less than −50° C.

For example, the entire Arctic Ocean (which is 5.427 million sq mi), comprises regions with liquid ocean water located within meters of air temperatures substantially less than the freezing temperature of water for over 6 months of the year. A rough calculation of the total available energy in this resource may involve the amount of available liquid water, the enthalpy of fusion of water, the temperature of the air, the Carnot efficiency from the temperature difference between the air and the water, and the practical energy efficiency (for example: 30% of Carnot efficiency). The liquid water resource may be assumed to regenerate annually due to ice melting during the warmer months, such as during the summer for the Northern Hemisphere and the winter for the Summer Hemisphere.

Example Calculation of Potential Resource and Opportunity

Enthalpy of Fusion of Water: 334 kJ/kg of water or 92.78 kWh per metric ton of water Air Temperature: The below air temperatures are based on the climate tables of Barrow, Ak. Barrow, Ak. was chosen because it borders the arctic ocean, is in the arctic circle, and is reasonably developed.
  Average Daily High Temperature November-April (6 months): −18.57° C.
  Average Daily Low Temperature November-April (6 months): −25.40° C.
  Daily Mean Temperature November-April (6 months): −21.99° C.

Carnot Efficiency from the temperature difference between the air and the water: The Carnot efficiency was calculated using the freezing point temperature of ocean water (−2° C.) and the daily mean temperature of Barrow, Ak. from November to April.
  Carnot Efficiency: 7.38%

Practical Energy Efficiency: The practical energy efficiency percentage was determined by multiplying the Carnot efficiency by 30% or 0.3. Although it is practical to achieve significantly greater percentages of Carnot efficiency using Organic Rankine Cycles or some other heat engine technologies, the 30% value was employed as a conservative estimate.
  Practical Energy Efficiency: 7.38%*0.3=2.21% or 0.021

Liquid Water Artic Ocean Potential Resource (Narrow): Although the amount of liquid water is practically infinite (the artic ocean is, on average, greater than 1,038 meters deep), the present calculation quantifies the available liquid water by employing the amount of ice which forms and then melts each year, which is represented by the 2 to 3 meters of ice which covers the artic ocean during cold months of the year. It is important to note the present resource calculation may be conservative as the amount of liquid water in the arctic ocean significantly exceeds the 3 meter depth employed in this calculation.
  Arctic Ocean Area: 5.427 million square miles or 14.0559 trillion square meters
  Volume of Water vs. Mass of Water: 1 cubic meter of ocean water equals 1 metric ton of water for simplicity
  Mass of Resource (Narrow): 42.17 trillion metric tons of liquid water
  Rough Calculation of Potential Electricity Generation Resource (Narrow):
    42.17 trillion metric tons of water*92.78 kWh per metric ton of water=3.913 quadrillion kWh of heat or 3.913 million terawatt-hours of heat
    3.913 million terawatt-hours of heat*0.021=82,152 terawatt-hours of electricity
  Annual Power Generation Resource from the Arctic Ocean (Narrow): 82,152 terawatt-hours of electricity (about 376.9% or 3.769 times the total electricity generated worldwide in 2016)

Liquid Water Artic Ocean Potential Resource (Broad): The artic ocean is, on average, about 1,038 meters deep. We will quantify the broad definition of liquid water availability by determining the total liquid water in the artic ocean. Please note the broad definition is for hypothetic potential.
  Arctic Ocean Area: 5.427 million square miles or 14.0559 trillion square meters
  Volume of Water vs. Mass of Water: 1 cubic meter of water equals 1 metric ton of water for simplicity
  Mass of Resource (Broad): 14,590 trillion metric tons of liquid water
  Rough Calculation of Potential Electricity Generation Resource (Broad):
    14,590 trillion metric tons of water*92.78 kWh per metric ton of water=1,353.7 quadrillion kWh of heat or 1,353.7 million terawatt-hours of heat
    1,353.7 million terawatt-hours of heat*0.021=28,427,777 terawatt-hours of electricity
  Power Generation Resource from the Arctic Ocean (Broad): 28,427,777 terawatt-hours of electricity (about 1,304,220% or 1,304 times the total electricity generated worldwide in 2016)

Even outside arctic circle or arctic ocean, many populated and unpopulated regions in the world have average air temperatures significantly below the freezing point of water for more than 6 months of the year and are close to liquid water. For example, Anchorage, Ak. borders the ocean and has average air temperatures significantly below the freezing point of water for more than 6 months. For example, Iceland and Greenland have average air temperatures significantly below the freezing point of water for more than 6 months. For example, in the southern hemisphere, Antarctica and the surrounding ocean has temperatures significantly below the freezing point of water for more than 6 months of the year. For example, many freshwater lakes in the world have suitable climates. For example, the air temperature above Lake Baikal (which contains 22-23% of the world's surface freshwater) is significantly below the freezing point of water for more than 6 months of the year. In North America, multiple regions of Quebec, Ontario, Manitoba, Saskatchewan, and the Northwest Territories borders lakes or the ocean and have average air temperatures significantly below the freezing point of water for more than 6 months of the year.

Although there are populated regions in suitable climates for the present invention, there are vast unpopulated or less populated regions with suitable climates for the present invention. Furthermore, even near populated regions, the electricity generation potential of the present invention may significantly exceed the electricity demands of the populated regions. Advantageously, potentially relatively low cost electricity produced by the present invention may be used for the production of valuable chemicals or other valuable byproducts or services, which may be transported or distributed from the electricity generation source and sold worldwide. Example services may include, but is not limited to, datacenters, or cryptocurrency mining, or communication systems. Example chemicals or production processes may include, but are not limited to, one or more or a combination of the following: hydrogen production, ammonia production, urea, ammonium nitrate, nitrogen fertilizers, urea derivatives, ammonia derivatives, aluminum production, air separation units, magnesium production, silicon production, metal refining, $CO_2$ conversion, $CO_2$ capture, capturing $CO_2$ from air, water desalination, liquefying air, liquefying nitrogen, liquefying oxygen, liquefying gases, solidifying $CO_2$, solidifying gases, liquefying natural gas, producing chemicals, producing hydrogen derivatives, producing hydrocarbons, or conversion of chemicals. Air separation or air liquification, for example, may benefit not only from low electricity costs, but also from the cooler air temperatures, which may advantageously enable lower energy requirements for air separation due to, for example, less cooling required to reach liquification temperatures and smaller temperature difference between ambient conditions and liquification conditions during the liquification process.

Some embodiments of the present invention pertain to generating power from the temperature difference generated by a liquid water freezing to ice (heat source) and a cold air (heat sink/cold source).

Embodiments may involve processes for generating power.

Power generating processes may include, but are not limited to, for example, one or more or a combination of the following: open cycle systems, updraft towers, downdraft towers, open air systems, osmotic heat engines, seawater osmotic heat engines, pneumatic systems, stirring motors, air working fluid heat engines, cryodesalination systems, or water working fluid heat engines. Said power generating processes may include, but are not limited to, for example, one or more or a combination of the following: organic Rankine cycles, Kalina cycles, or osmotic heat engines, or a combination thereof, or similar process in various configurations.

Power generating processes may include, but not limited to, for example, one or more or a combination of the following: process for preventing or minimizing ice accumulation, removal of ice, disposal of ice, returning ice or water or both to environment, harvesting water source, pumping or transferring water, tapping water source, prevention of marine fouling, treatment of marine foulants, prevention of harm to marine life, and implementation in various applications.

Embodiments may involve a portable power generation and/or valuable byproduct or service production process. Said process may generate said power, and/or byproduct, and/or service by generating energy from the difference in temperature of water freezing (heat source) and a significantly colder outside air temperature (heat sink/cold side). In some embodiments, said portable process may generate power and/or valuable byproducts or services in the Northern Hemisphere in the winter (and/or other times of the year when it is sufficiently cold) and in the Southern Hemisphere during the summer (and/or other times of the year when it is sufficiently cold), which may enable greater capacity factor or capacity utilization. Said portable process may be located on a ship or located on an aircraft or transportable on a ship or transportable on an aircraft.

Some embodiments pertain to a process for generating electricity from the temperature difference generated by a heat source comprising liquid water freezing to ice and a 'heat sink' comprising 'cold' air.

In some embodiments, water spray and/or the enthalpy of freezing increases the temperature of the air, which may result in warmer air than a surrounding or adjacent air temperature. Said temperature increase may be due to the water freezing and/or due to the specific heat capacity of the water and/or due to the specific heat capacity of the resulting ice and/or a combination thereof. It may be advantageous to spray said liquid water at a lower height relative to the full height of the tower to, for example, maximize the tower's capture or harnessing of the resulting rising 'warmer' air. Said warmer air may rise and additional air may move into the tower to replace the rising air, which may involve a 'chimney effect'. The resulting airflow of the rising air may power an air turbine, generating power. Due to, for example, water freezing, ice or snow may accumulate in, for example, the bottom of the tower or another location or a combination thereof. Said ice or snow may be removed periodically or continuously. Said ice or snow removal may be passive, or active, or a combination thereof.

Some embodiments of the present invention may be configured to have one or more or a combination of mechanisms to continuously or periodically remove ice.

For example, some embodiments may involve passive ice removal, which may include, but is not limited to, angled and/or coated surfaces which facilitate and/or guide ice out of one or more parts of the system. Said parts of the system may include, but are not limited to, air flow channels.

For example, some embodiments may be configured with a trap door, which periodically opens to release accumulated ice or snow into a separate region and then closes. For example, accumulate ice or snow in said separate region may be removed by including, but not limited to, one or more or a combination of the following: snow plow, or rail car, or crane, or ship, or conveyor belt, or snow blower, or ice blower, or plow, or other method of transport or removal, or a combination thereof.

Other advantages of some embodiments of the present invention may include, but are not limited to, one or more or a combination of the following:

Low CAPEX
Low OPEX
No or minimal heat exchange losses
Low complexity
May not contain a heat exchanger if desired
Exploits full range of available temperature difference for power generation
No expensive working fluids
Environmentally benign working fluids and operations
Low cost materials
Environmentally beneficial
May be infinitely scalable
High capacity factor
May generate electricity during night and day and may comprise a relatively baseload or dispatchable or both power generation source in cold climates Example Calculated Values of Water Flow Rate and Water Pumping Power Requirement The present calculated values assume a Carnot efficiency of $\neg 7.38\%$, a power generation system with an efficiency 30% of the Carnot efficiency, and heat is supply for power generation is from the enthalpy of freezing of water.

0.513 metric tons of liquid water converted to ice per kWh of electricity generated An example implementation may be a 10 MW power generation system. If operating at full power generation capacity, the present example will freeze 5,130 metric tons of liquid water per hour, or about 85.5 metric tons of water per minute, or 8.55 metric tons water per MW per minute. Based on a water pump pressure head of 30 meters (3 Bar)

and a 60% water pump energy efficiency, the water pumping will consume about 0.7 MW of power, or about 7% of the total electricity production of the power generation system.

Example Definitions

Air Heating Area: An air heating area may comprise a portion of the process where the temperature of air is increased. The temperature of air in an air heating area may be increased by contacting 'cold' air at a temperature below the freezing point of liquid water or an aqueous solution with liquid water or aqueous solution, which may result in the formation of 'warm' air and frozen liquid water. The temperature of air in an air heating area may be increased by contacting 'cold' air with liquid water or aqueous solution warmer than said 'cold' air, which may result in the formation of 'warm' air.

Air Turbine or Pneumatic Turbine: An Air Turbine or Pneumatic Turbine may comprise a system which converts the motion of air into power, such as mechanical work, electricity, or a combination thereof. An Air Turbine or Pneumatic Turbine may comprise, for example, a vertical axis or horizonal axis rotating blade connected to a gearbox and/or generator.

Cold Air: Cold Air may comprise air at a lower temperature than Warm Air. Cold Air may comprise, for example, including, but not limited to, one or more or a combination of the following: 'fresh' air or air entering a process or outside air or adjacent air, or air at or near an outdoor air temperature, or air colder than the freezing point of water, or air at a temperature less than the liquid entering the process, or a combination thereof.

Warm Air: Cold Air may comprise air at a lower temperature than Warm Air. Cold Air may comprise, for example, including, but not limited to, one or more or a combination of the following: 'fresh' air or air entering a process or outside air or adjacent air, or air at or near an outdoor air temperature, or air colder than the freezing point of water, or air at a temperature less than the liquid entering the process, or a combination thereof.

Tower: A Tower may comprise a structure which may guide or direct airflow in a vertical direction or vertical plane.

Updraft: Air flow which flows from a lower elevation to a higher elevation.

Channel: A defined space in which a fluid, such as air or water, may move through.

Passive Process: A process or process step which can operate without external work put, such as electrical or mechanical work.

Active Process: A process or process step which requires external work input, such as electrical or mechanical work, to operate.

Chimney Effect or Stack Effect: Chimney Effect or Stack Effect is the movement of air into and out of structures, such as tubes, buildings, towers, or chimneys, due to air buoyancy or the difference in density between air inside and outside a structure.

Buoyancy: Buoyancy is an upward force exerted by a fluid on another fluid (or object) with a different density. For example, 'warm' air may be less dense than 'cold' air and 'warm' air may rise in the presence of 'cold' air. For example, 'humid' air may be less dense than 'dry' air and 'humid' air may rise in the presence of 'dry' air.

Convection: The movement caused within a fluid by the tendency of hotter and therefore less dense material to rise, and colder, denser material to sink under the influence of gravity, which consequently results in transfer of heat.

Dry Air: Air with a lower water vapor partial pressure or water vapor concentration at the same pressure as 'humid air'.

Humid Air: Air with a higher water vapor partial pressure or water vapor concentration at the same pressure as 'dry air'.

Figure Descriptions

FIG. 1: The present figure may show an embodiment comprising an updraft tower configured to generate power from the enthalpy of freezing of liquid water. In the present figure, the process may be generating power.

Figure 2:
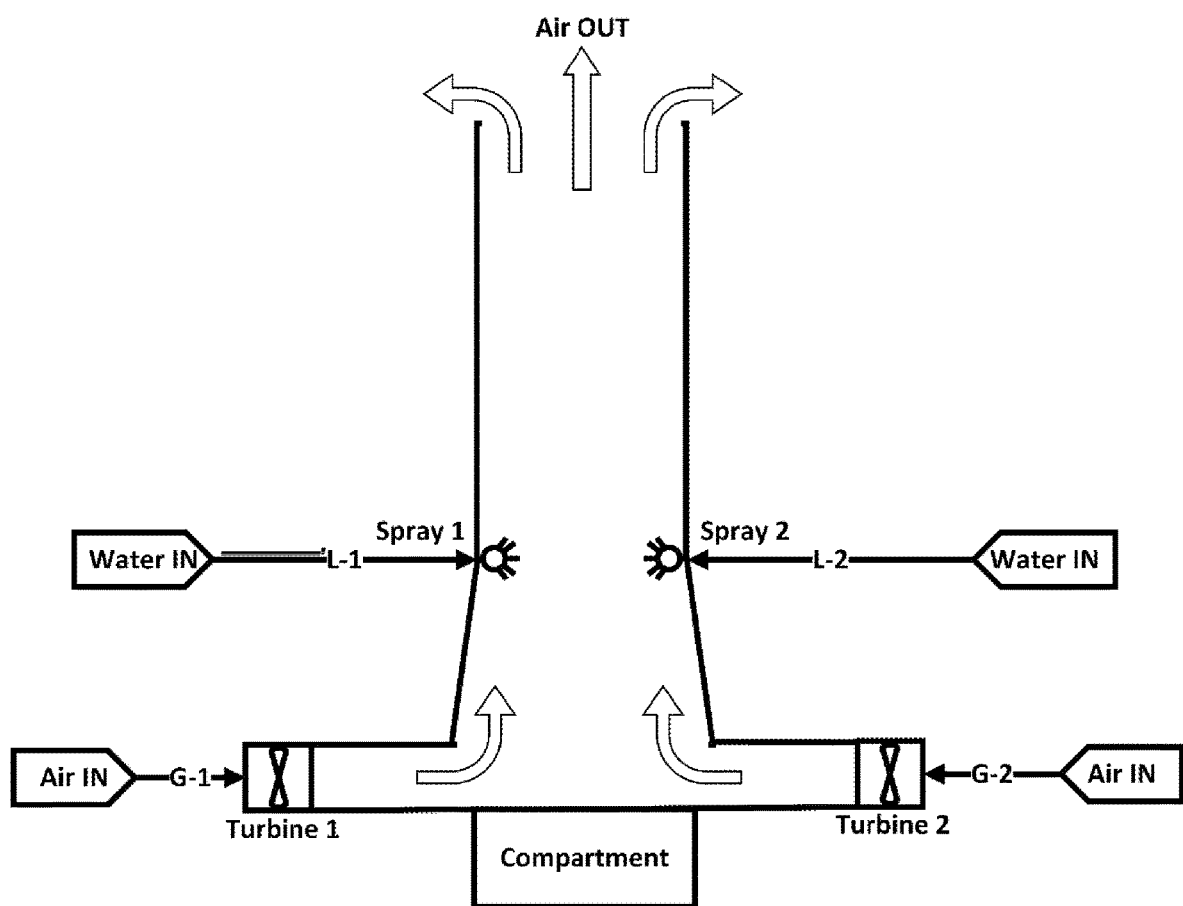
FIG. 2 shows an embodiment comprising a tower configured to generate power from the enthalpy of freezing of liquid water with an example ice or snow collection compartment.

FIG. 2: The present figure may show an embodiment comprising an updraft tower configured to generate power from the enthalpy of freezing of liquid water. The present figure may show an embodiment with an example ice or snow collection compartment, which may, if desired, be located beneath the height which air enters the interior of the tower or the water-air contactors. In the present figure, the embodiment may be generating power.

Figure 3:
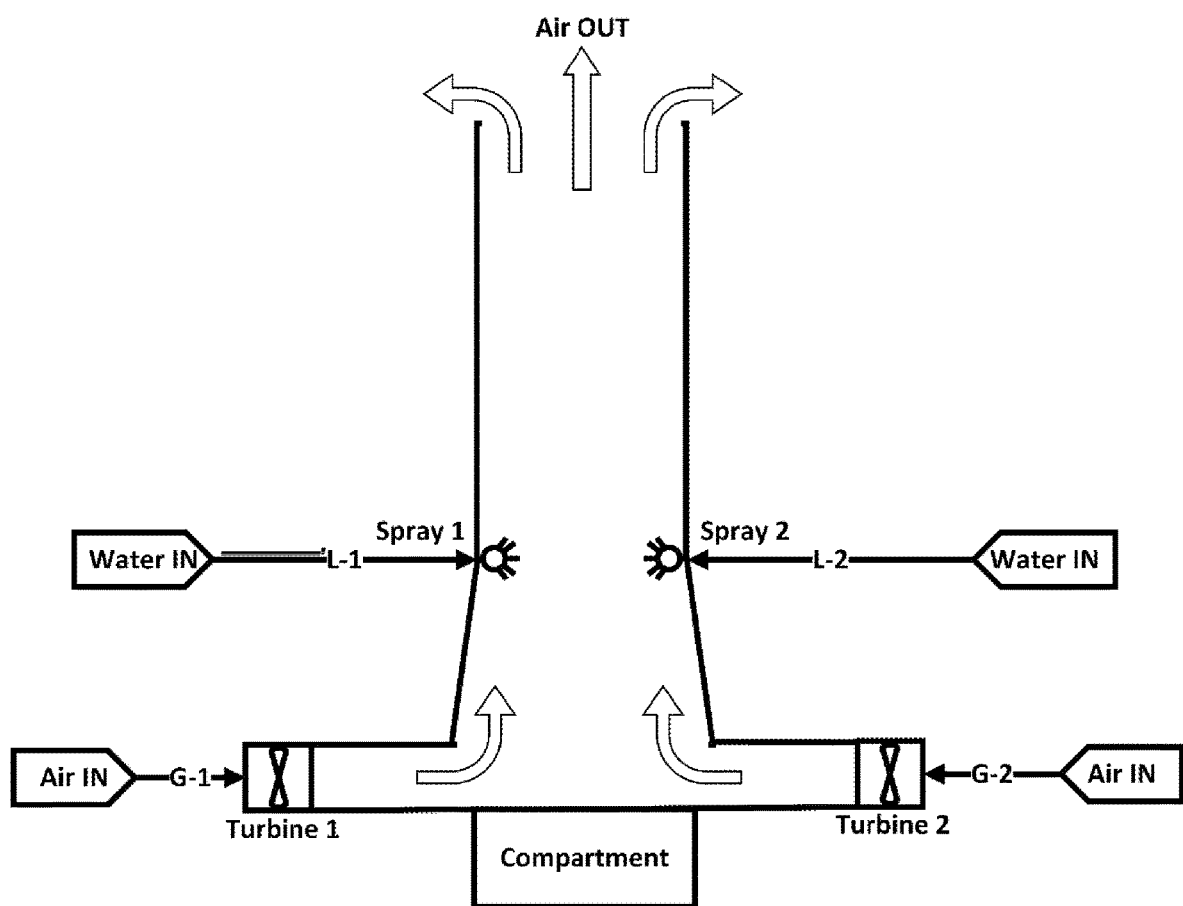
FIG. 3 shows an embodiment comprising a tower configured to generate power from the enthalpy of freezing of liquid water with ice or snow being removed from the tower.

FIG. 3: The present figure may show an embodiment comprising an updraft tower configured to generate power from the enthalpy of freezing of liquid water. The present figure may show an embodiment with ice or snow being removed from the tower. In the present figure, power generation is paused to allow ice or snow removal, which may be required if, for example, ice or snow removal involves opening a new potential pathway for air to enter. It is important to note that, in some embodiments, power generation may continue during ice or snow removal.

Figure 4:
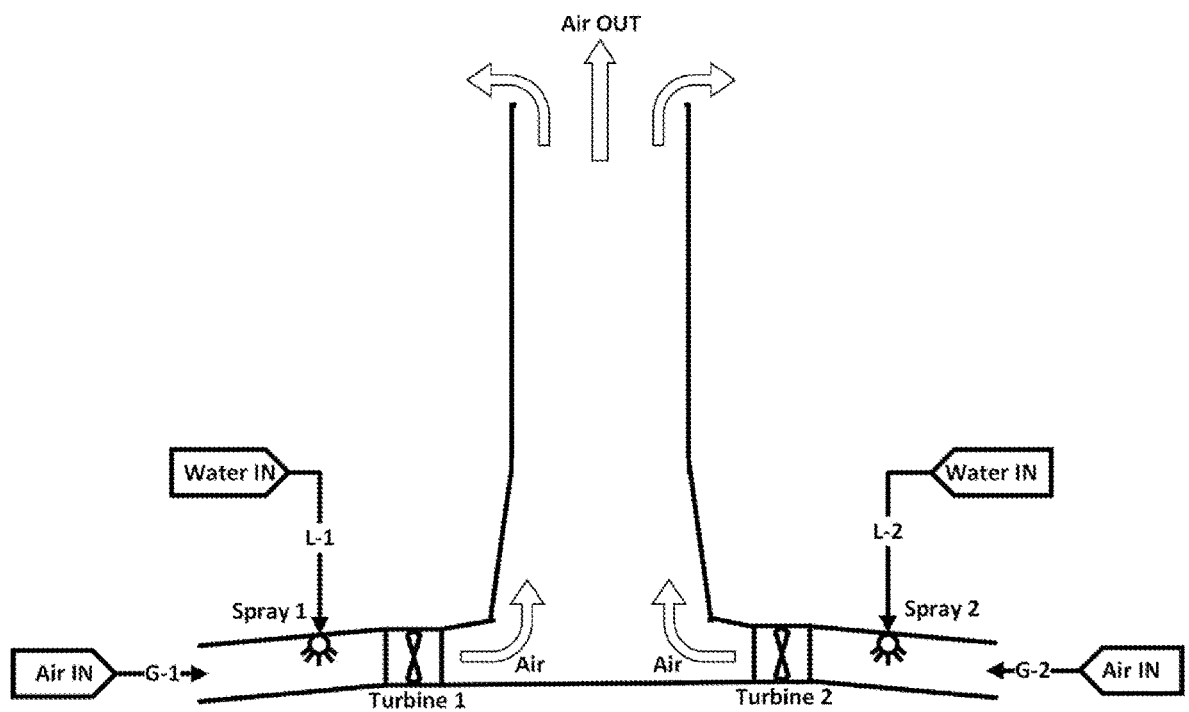
FIG. 4 shows an embodiment comprising a tower configured to generate power from the enthalpy of freezing of liquid water wherein liquid water is contacted with air at the base of a tower.

FIG. 4: The present figure may show a process for generating electricity from the temperature difference between heat generated from the enthalpy of freezing of water and 'cold' air. The present figure may show an embodiment where liquid water is contacted with air in a section at the base of a tower, which may result in warming said air due to the enthalpy of freezing of water and the specific heat capacity of water. Said warm air may rise within the tower due to, for example, convection, and forming a 'chimney effect'. At least a portion of resulting airflow may pass through or power one or two or more air turbines, which may be located at or near the base of the tower. The present figure may show the present embodiment generating power.

Figure 5:
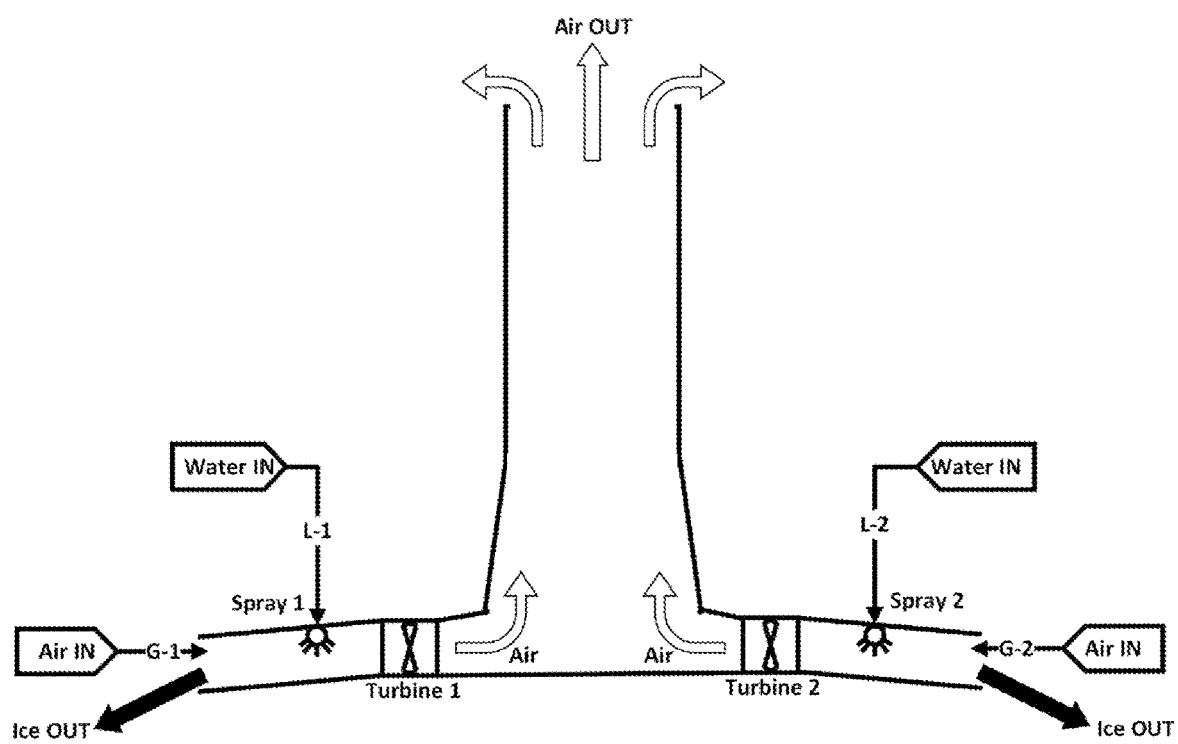
FIG. 5 shows an embodiment comprising a tower configured to generate power from the enthalpy of freezing of liquid water wherein ice or snow may exit.

FIG. 5: The present figure may show a process for generating electricity from the temperature difference between heat generated from the enthalpy of freezing of water and 'cold' air. The present figure may show a process where ice or snow, which may be produced by the process, may exit the process while the process is generating electricity.

| Process Element Label | Description |
|---|---|
| | Example Figure Key |
| L-1 | Liquid water stream entering a sprayer. Water may be pumped from a water source, such as an ocean or lake or pond or other water body. The water may be pumped from liquid water present beneath the surface of ice in a water body. Liquid water sources or liquid water transport (for example, L-1 or L-2) may be insulated or buried beneath ground, or heated, surrounded with ice, or a combination thereof, or employ other or additional methods to prevent ice formation within the water transport line. Alternatively, or additionally, the water transport line may be periodically defrosted when waterflow is restricted with ice. Periodic defrosting may involve, for example, passing warmer water or steam or antifreeze solution or brine through the pipe, pump, and/or other process or equipment which may need defrosting. |
| L-2 | Liquid water stream entering a sprayer. Water may be pumped from a water source, such as an ocean or lake or pond water body. The water may be pumped from liquid water present beneath the surface of ice in a water body. Liquid water sources or liquid water transport (for example, L-1 or L-2) may be insulated or buried beneath ground, or heated, surrounded with ice, or a combination thereof, or employ other or additional methods to prevent ice formation within the water transport line. Alternatively, or additionally, the water transport line may be periodically defrosted if or when waterflow is restricted with ice. Periodic defrosting may involve, for example, passing warmer water or steam or antifreeze or brine solution through the pipe, pump, and/or other process or equipment which may need defrosting. |
| Spray 1 | A spay unit to contact air with liquid water. The spay may disperse the water in the colder air such that the water freezes during contact with said air and warms said air. It is important to note the present process element may comprise a water - gas contactor other than a spay unit or in addition to a spay unit. |
| Spray 2 | A spay unit to contact air with liquid water. The spay may disperse the water in the colder air such that the water freezes during contact with said air and warms said air. It is important to note the present process element may comprise a water - gas contactor other than a spay unit or in addition to a spay unit. It is important to note the present embodiment may employ one or more spray units or one continuous spray unit. |
| G-1 | G-1 may comprise air entering the tower before an air turbine. G-1 may be fresh air or cold air surrounding or outside the tower. |
| G-2 | G-1 may comprise air entering the tower before an air turbine. G-2 may be fresh air or cold air surrounding or outside the tower. |
| Turbine 1 | Turbine 1 may comprise an air or pneumatic turbine, which may generate power from the flow of air entering and/or exiting the tower. |
| Turbine 2 | Turbine 2 may comprise an air or pneumatic turbine, which may generate power from the flow of air entering and/or exiting the tower. |
| Compartment | The compartment may comprise a region of the tower for collecting or removing or a combination thereof snow or ice. Said snow or ice may be generated due to water sprayed into the tower or from atmospheric precipitation or from other means or from a combination thereof. Said compartment may involve a continuous or batch process for collecting and/or removing said snow or ice. It may be desirable for the compartment to be at least partially closed to outside the tower during power generation operations, as this may ensure airflow in the tower passes through air turbines or other means of power generation. |
| Ice OUT | 'Ice OUT' may signify one or more or a combination of systems and methods which may be employed to remove ice or snow from the tower. |

Step-by-Step Description:
1) Spraying Liquid Water (Air-Liquid Water Contacting): Liquid water may be sprayed into the air within the tower using for example, 'Spray 1' and/or 'Spray 2'. Sprayed liquid water may freeze into ice or snow, which may release heat and may warm the surrounding air. Said warm air may rise. Said ice or snow may fall, or stick to surfaces, or exit the tower with the rising warm air, or a combination thereof. It may be desirable for most of said generated ice or snow to be removed from the process or to be transferred to parts of the process which enable or facilitate the removal of said ice or snow.
2) Generating Power from Resulting Airflow: The resulting warm air from step 1 may rise and exit said tower, which may drive air from outside the tower into the tower in a form of 'chimney' effect. Said air may pass through one or two or more pneumatic or air turbines while entering the tower, generating power. In some embodiments, pneumatic or air turbine generators may be located near the bottom of tower and may generate power from the air as the air enters the tower. Note that one or more or a combination of configurations for generating electricity from rising air or airflow may be employed, which may include, but are not limited to, air turbines generating power from the air entering the process, air turbines generating power from the air exiting the tower, air turbines inside the tower, air turbines at the base of the tower, air turbines near the bottom of the tower, air turbines near the middle of the tower, or a combination thereof
3) Collection or Removal of Ice or Snow: Ice or snow may be periodically or continuously removed. Removal of ice or snow may be passive or active.

In some embodiments, portion of the resulting ice or snow may exit the process during process operations, such as during electricity generation. For example, in some embodiments, ice or snow may exit through an angled surface. For example, in some embodiments, ice or snow removal may be facilitated by non-stick surfaces or non-stick coatings. For example, in some embodiments, ice or snow removal may be facilitated by brine coatings or salts. For example, in some embodiments, ice or snow removal may be facilitated by agitation, such as vibration or shaking. For example, in some embodiments, ice or snow removal may be facilitated by an active device, such as a plow or wiper or conveyor belt or belt, or moving surface, or a combination thereof In some embodiments, a portion of the resulting ice or snow may sink to the bottom of the tower and/or may be collected and/or removed. A tower may be designed with a compartment or region meant to collect snow or ice near the bottom of the tower. Snow may be periodically or continuously dumped or removed from this region, as shown, for example, in FIG. 3. The removal of said snow or ice may involve a pause in power generation from the tower or the tower may continue to operate during snow or ice removal. The main purpose of ice or snow removal may be to prevent restrictions in airflow or reductions in efficiency or structural damage or a combination thereof resulting from said snow or ice or salts in said snow or ice. Snow or ice may collect in regions outside the tower or on the walls of the tower or a combination thereof. Said snow or ice may be removed if desired, for example, if it is at risk of restricting airflow, reducing efficiency, or causing structural damage. Similarly, snow or ice may be removed from the air turbines or prevented from forming or attaching to air turbines.

Example Exemplary Embodiments

1. A process for generating power comprising:
Heating 'cold air' into 'warm air' by contacting 'cold air' with liquid water wherein the exothermic freezing of said liquid water into ice generates heat; and
Generating power from the movement of 'warm air' due to buoyancy.
2. The process of example embodiment 1 wherein said buoyancy results from convection
3. The process of example embodiment 1 wherein said buoyancy results from greater water vapor partial pressure in 'warm' air than the water vapor partial pressure in 'cold' air
4. The process of example embodiment 1 wherein the temperature of said cold air is lower than the freezing point of said liquid water
5. The process of example embodiment 1 wherein said liquid water is sourced from liquid water present underneath the ice in a water body covered with ice
6. The process of example embodiment 1 wherein the temperature of said cold air is less than $-5°$ C.
7. The process of example embodiment 1 wherein said liquid water comprises water from a lake, or ocean, or river
8. The process of example embodiment 1 wherein said generating power involves an air turbine
9. The process of example embodiment 1 wherein said movement of 'warm air' due to buoyancy occurs within a channel
10. The process of example embodiment 1 wherein said movement of 'warm air' due to buoyancy occurs within a tower
11. The process of example embodiment 10 wherein an air turbine is located near the base of said tower
12. The process of example embodiment 11 wherein air passes through said air turbine due to the Chimney Effect
13. The process of example embodiment 1 wherein said frozen water is removed from the process to reduce the obstruction of airflow due to said frozen water
14. The process of example embodiment 10 wherein said tower and air turbine may be located on a floating structure
15. The process of example embodiment 10 wherein said tower and air turbine may be located on a fixed structure located in a water body
16. The process of example embodiment 10 wherein said tower and air turbine may be located on a fixed structure located on land
17. The process of example embodiment 13 wherein frozen water is removed by means of a passive process
18. The process of example embodiment 13 wherein frozen water is removed by means of an active process
19. The process of example embodiment 1 wherein power generated may be converted into hydrogen, ammonia, synthesis gas, or derivatives thereof
20. The process of example embodiment 1 wherein power generated may be transferred via a subsea cable
21. The process of example embodiment 10 wherein air enters near the bottom of the tower and exits near the top of the tower
22. The process of example embodiment 8 wherein liquid water is contacted with air before the air enters an air turbine
23. The process of example embodiment 8 wherein liquid water is contacted with air after the air enters an air turbine
24. The process of example embodiment 8 wherein liquid water is contacted with air after the air has passed through an air turbine
25. The process of example embodiment 1 wherein contacting 'cold air' with liquid water is conducted in an air heating area adjacent to a tower
26. The process of example embodiment 1 wherein contacting 'cold air' with liquid water is conducted in an air heating area inside a tower
27. The process of example embodiment 8 wherein said air turbine is located next to a tower
28. The process of example embodiment 8 wherein said air turbine is located inside a tower
29. The process of example embodiment 1 wherein said 'cold' air temperature is the outside air temperature
30. The process of example embodiment 1 wherein the process generates power in the northern hemisphere during the northern hemisphere winter and wherein the process generates power in the southern hemisphere during the southern hemisphere winter A process for generating power comprising:
A liquid water source
An air source with an air temperature of less than 0° C.
Wherein power is generated from the temperature difference between heat released by the enthalpy of freezing of said water and the temperature of said air A process for generating power comprising:
A liquid water source
An air source with an air temperature of less than 0° C.
Wherein the freezing of said liquid water comprises a heat source; and
Wherein said air comprises a heat sink
A heat engine process for generating power comprising:
A liquid water source
An air source with an air temperature of less than 0° C.
Wherein the freezing of said liquid water comprises a heat source; and
Wherein said air comprises a heat sink
A process for generating power comprising:
An updraft tower
Wherein water is contacted with air and increases the temperature of at least a portion of air
Wherein air rises inside said updraft tower due to convection
Wherein power is generated from airflow generated by said rising air
A process for generating power comprising:
An updraft tower
Wherein water is sprayed into said updraft tower and increases the temperature of at least a portion of air inside said updraft tower
Wherein air rises inside said updraft tower due to said increase in temperature of said air
Wherein power is generated from airflow generated by said rising air
A process for generating power comprising:
An updraft tower
Wherein water is sprayed into said updraft tower
Wherein at least a portion of said water freezes, increasing the temperature of at least a portion of air inside said updraft tower due to the heat from the enthalpy of freezing of air
Wherein air rises inside said updraft tower due to said increase in temperature of said air
Wherein power is generated from airflow generated by said rising air
A process for generating power comprising:
A liquid desiccant source
A humid air source
Wherein power is generated from the temperature difference between heat released by the enthalpy of absorption of water vapor into said liquid desiccant and the temperature of said air
A process for generating power comprising:
A liquid desiccant source
A humid air source
Wherein the absorption of water vapor into said liquid desiccant comprises a heat source; and
Wherein said air comprises a heat sink
A heat engine process for generating power comprising:
A liquid desiccant source
A humid air source
Wherein the absorption of water vapor into said liquid desiccant comprises a heat source; and
Wherein said air comprises a heat sink
A process for generating power comprising:
An updraft tower
Wherein a liquid desiccant is sprayed into said updraft tower
Wherein at least a portion of said liquid desiccant absorbs water from the air, increasing the temperature of at least a portion of air inside said updraft tower
Wherein air rises inside said updraft tower due to said increase in temperature of said air
Wherein power is generated from airflow generated by said rising air
Wherein said water is sourced from one or more or a combination of the following: ocean, a water body, a lake, from water originating beneath an ice surface, wastewater, runoff water, aquifer, desalinated water, rainwater, ice melt water, aquifer water, well water, spring water, groundwater, river water, frack water, discharge water, ballast water, or a combination thereof
Wherein said air comprises air from the outdoors
Wherein said air is ambient air
Wherein said air temperature is the outside air temperature
Wherein said air temperature comprises air cooled by another means
Wherein said spraying comprises one or more or a combination of water—air contactors Example Further Notes Note: Ice or snow removal may operate continuously or simultaneously to power generation if, for example, the air turbine or pneumatic generator is in contact with or generates energy from the rising air exiting the tower. For example, said air turbine may be located above the height of the spay towers shown in FIGS. 1-3.

Note: Some embodiments may employ frozen water, or ice, or snow removal to reduce the obstruction of airflow due to said frozen water, or ice, or snow.

Note: Alternatively, a liquid desiccant, such as a salt brine solution, may be employed to generate heat by means of absorbing water vapor from the air. Water-lean liquid desiccant may be sprayed into said tower in a similar manner to said liquid water. Said water-lean liquid desiccant may absorb water vapor from the air and form water-rich liquid desiccant. Said absorption of water vapor may heat the surrounding air due to the exothermic nature of absorbing water vapor, which may result in air rising within the updraft tower. Airflow generated from said rising air may be employed to generate power. Said water-rich liquid desiccant may be collected, for example, in a similar manner to the 'compartment' described for collecting ice or snow in other embodiments described herein. Said water-rich liquid desiccant may be regenerated in, for example, evaporation ponds, membrane distillation, distillation, solar evaporation, or other method. Alternatively, or additionally, if said water-rich desiccant is not completely 'water-rich', a portion of air water-rich desiccant may be recirculated. Alternatively, or additionally, said water-rich liquid desiccant may comprise saline water from a natural brine source, such as a brine lake or aquafer. For example, said natural brine source may comprise the Great Salt Lake, or the Dead Sea, or a hypersaline lake, or a saline aquifer, or saline water resulting from $CO_2$ injection for $CO_2$ sequestration, or a combination thereof. If said water-rich liquid desiccant is from a natural source, it may be desirable to return the resulting water-rich liquid desiccant to said natural source. It is important to note it may be desirable to employ the present embodiment in hot and/or humid climates.

Surrounding or input air temperatures for enthalpy of freezing power generation processes may be less than, greater than, or equal to one or more or a combination of the following: 0° C., or −5° C., or −10° C., or −15° C., or −20° C., or −25° C., or −30° C., or −35° C., or −40° C., or −45° C., or −50° C., or 5° C., or 10° C., or 15° C., or 20° C., or 25° C., or 30° C., or 35° C., or 40° C., or 45° C., or 50° C., or −60° C., or −70° C., or −80° C.

Surrounding or input air temperatures for enthalpy of absorption power generation processes may be greater than, or equal to one or more or a combination of the following: 0° C., or 5° C., or 10° C., or 15° C., or 20° C., or 25° C., or 30° C., or 35° C., or 40° C., or 45° C., or 50° C., or 0° C., or −5° C., or −10° C., or −15° C., or −20° C., or −25° C., or −30° C., or −35° C., or −40° C., or −45° C., or −50° C., or −60° C., or −70° C., or −80° C.

The freezing point of a liquid may be greater than, or equal to one or more or a combination of the following: 0° C., or 5° C., or 10° C., or 15° C., or 20° C., or 25° C., or 30° C., or 35° C., or 40° C., or 45° C., or 50° C., or 0° C., or −5° C., or −10° C., or −15° C., or −20° C., or −25° C., or −30° C., or −35° C., or −40° C., or −45° C., or −50° C., or −60° C., or −70° C., or −80° C.

Water may comprise pure water or compositions comprising at least a portion water. The freezing point of water may be greater than, or equal to one or more or a combination of the following: 0° C., or 5° C., or 10° C., or 15° C., or 20° C., or 25° C., or 30° C., or 35° C., or 40° C., or 45° C., or 50° C., or 0° C., or −1° C., or −2° C., or −3° C., or −4° C., or −5° C., or −6° C., or −7° C., or −8° C., or −9° C., or −10° C., or −15° C., or −20° C., or −25° C., or −30° C., or −35° C., or −40° C., or −45° C., or −50° C., or −60° C., or −70° C., or −80° C.

In some embodiments, air with a suitable temperature or humidity or both may be less than, greater than, or equal to one or more or a combination of the following away from liquid water: 0 meters, or 25 meters, or 50 meters, or 100 meters, or 200 meters, or 500 meters, or 1 km, or 1.25 km, or 1.5 km, or 2 km, or 5 km, or 10 km, or 15 km, or 20 km, or 25 km, or 30 km, or 35 km, or 40 km, or 45 km, or 50 km.

In some embodiments, air with a suitable temperature or humidity or both may be less than, greater than, or equal to one or more or a combination of the following away from liquid desiccant: 0 meters, or 25 meters, or 50 meters, or 100 meters, or 200 meters, or 500 meters, or 1 km, or 1.25 km, or 1.5 km, or 2 km, or 5 km, or 10 km, or 15 km, or 20 km, or 25 km, or 30 km, or 35 km, or 40 km, or 45 km, or 50 km.

Note: Temperature may vary as with any climate condition. Power generation or other operations may be paused when temperature or other parameters are not suitable or undesirable and may return to operation when said temperature or other parameters are suitable or desirable.

Note: Systems and methods may be employed to prevent or remove biofouling such as marine or aquatic biofouling. Systems and methods may include, but are not limited to, one or more or a combination of the following: coatings, materials of construction, cleaning practices, removal of biofouling on water intake pipes, barriers or filtration methods to prevent marine life from entering water supply, or other systems and methods known in the art.

Note: Corrosion may be prevented using, for example, including, but not limited to, one or more or a combination of the following: corrosion resistant materials of construction, coatings, rinsing, rinsing to remove salt, rinsing with corrosion inhibitor, corrosion inhibitors, or systems and methods known in the art.

Note: Harm to marine life may be prevented by, for example, employing a barrier or other means of preventing intake of marine animals in water intake, or other water intake methods known in the art which minimize or prevent harm to marine life.

Note: Shape of tower may include, but is not limited to, one or more or a combination of the following: cylinder, cylinder with wider base at bottom than top, cylinder with wider top than bottom or base, rectangular prism, rectangular prism with wider base at bottom than top, rectangular prism with wider top than bottom or base, octagonal prism, octagonal prism with wider base at bottom than top, octagonal prism with wider top than bottom or base, prism, prism with wider top than bottom or base, tube, or tower designs known in the art.

Note: If may be desirable to build said tower into or alone the side of a hill or mountain. This may reduce the capital cost, or increase energy efficiency, or enable the construction of a larger or longer tower.

Note: Some embodiments of the present invention may be designed to be stranded or isolated. For example, some embodiments of the present invention may involve isolated power generation to produce electricity to power hydrogen product to produce ammonia or other hydrogen derived chemicals, which may be stored during cold months of the year. When the platform is accessible by boat, the stored ammonia or other hydrogen derived chemicals may be transported to civilization or markets. In some embodiments, said chemicals may be transferred to land or FSO by means of a pipe or pipeline system.

Note: In some embodiments, the present invention may be located on a fixed and/or raised platform in a water body. During colder times of year, said platform may be surrounded by ice floating on the surface of a water body. In some embodiments, liquid water may be pumped from beneath the sea ice, which may be near the base of the platform, and transferred to one or more 'sprayers' or water-air contactors within the power generation process.

Note: In some embodiments, the present invention may be located on a fixed and/or raised platform in a water body. During colder times of year, said platform may be surrounded by ice floating on the surface of a water body. In some embodiments, liquid water may be pumped from beneath the sea ice and/or otherwise beneath the surface of the water body, which may be near the base of the platform, and transferred to one or more 'sprayers' or water-air contactors.

Note: In some embodiments, the present invention may be located on a floating structure in a water body. During colder times of year, said floating structure may be surrounded by ice floating on the surface of a water body. In some embodiments, liquid water may be pumped from beneath the sea ice and/or otherwise beneath the surface of the water body and transferred to one or more 'sprayers' or water-air contactors.

Note: In some embodiments, the present invention may generate power in the Northern Hemisphere during some times of the year and in the Southern Hemisphere in some times of the year. For example, the present invention may generate power in the Northern Hemisphere during cold months in the Northern Hemisphere and may generate power in the Southern Hemisphere during cold months in the Southern Hemisphere. For example, the present invention may generate power in the Northern Hemisphere during the 'winter' in the Northern Hemisphere and may generate power in the Southern Hemisphere during 'winter' in the Southern Hemisphere. If desired, the process may be transported between the Northern Hemisphere and Southern Hemisphere during one or more timeframes.

Note: Water—air contactors or water sprayers may be located in one or more or a combination of locations within the present invention and/or with one or more or a combination of configurations. In some configurations, water—air contactors or water sprayers may be located near the bottom or base of an updraft tower. In some configurations, water—air contactors or water sprayers may be located in air heating areas adjacent to the base of an updraft tower. In some configurations, water—air contactors or water sprayers may be located near the middle of an updraft tower. In some configurations, water—air contactors or water sprayers may be located near the top of an updraft tower. In some embodiments, water sprayers may be located at a combination of different locations and/or elevations. In some embodiments, water sprayers may spray from different locations or may change spraying location or spraying angle or spraying volume or a combination thereof depending on various factors, which may include, but are not limited to, one or more or a combination of the following: outdoor air temperature or desired power output. In some configurations, water—air contactors or water sprayers may spray water on incoming airflow before said airflow powers an air turbine. In some configurations, water—air contactors or water sprayers may spray water on airflow after said airflow powers an air turbine.

Note: In some embodiments of the present invention, air turbines may be located in one or more or a combination of locations within the present invention. In some configurations, air turbines may be located near the bottom or base of an updraft tower. In some configurations, air turbines may be located in or near or adjacent to an air heating area. In some configurations, air turbines may be located inside an updraft tower. In some configurations, air turbines may be located near the middle of an updraft tower. In some configurations, air turbines may be located near the middle of an updraft tower. In some configurations, air turbines may be located near the top of an updraft tower. In some configurations, air turbines may be located at a combination of different locations and/or elevations.

Note: In some embodiments of the present invention may be employed for cryodesalination or 'freeze' desalination of saline water, such as seawater or ocean water.

Note: Power may be adjusted, by, for example, including, but not limited to, one or more or a combination of the following: adjusting water flow rate, or adjusting air to water ratio, adjusting the shape of the air channel or air input section or air intake, or adjusting the cross sectional area of one or more air channels, or adjusting the angle and/or surface area to volume of water contacted with air, or adjusting the air turbine rotation speed, or adjusting the output of the air turbine, or adjusting the blade pitch of an air turbine, or adjusting the angle of attack of an air turbine blade, or adjusting the gearing of an air turbine.

Note: Some embodiments of the present invention may involve more than one updraft tower. Some embodiments may involve creating tower 'farms', similar to wind farms currently employed in the offshore wind industry. The scale and/or height of a. Some of the technologies employed in the offshore wind industry may be directly applicable to some embodiments of the present invention. For example, the mass production, transportation, and installation of large tubular structures. For example, the mass production, transportation, and installation of large structures in the ocean or related offshore environments. For example, the mass production, transportation, and installation air turbines and air turbine generators. For example, algorithms for predicting and optimizing power generation using weather data and other information.

Note: In some embodiments, power may be transferred to applications requiring said power by means of a subsea cable, such as a subsea electricity cable. In some embodiments, power may be transferred to applications storing said power by means of a subsea cable, such as a subsea electricity cable. In some embodiments, power may be transferred to applications further transferring said power by means of a subsea cable, such as a subsea electricity cable.

Note: In some embodiments of the present invention may generate electricity from heat generated from the absorption of water vapor into a desiccant, such as a liquid desiccant, or solid desiccant, or a combination thereof. The absorption of water vapor into a desiccant is generally exothermic. If sprayed or dispersed or contacted with humid air, the temperature of a desiccant absorbing water vapor from air or other gas stream may increase and the temperature of the air or other gas stream in contact with or adjacent to said desiccant may also increase. In some embodiments, a desiccant may comprise a liquid, which may include, but is not limited to, a saline brine, or aqueous salt solution, or an organic solvent, or a combination thereof. In some embodiments, said desiccant may comprise a solid which transforms at least a portion into a liquid during absorption of water vapor. In some embodiments, said desiccant may comprise a solid which may remain a solid during the absorption of water vapor. In some embodiments, a desiccant may originate from a brine lake or ocean or natural environment and, after absorbing water vapor, the water-rich desiccant may be returned to its place of origin. In some embodiments, a desiccant may be regenerated, which may involve, including, but not limited to, solar evaporation, crystallization, precipitation, cryodesalination, variations in humidity, evaporation, variations in temperature, or a combination thereof Note: In some embodiments, the ratio of water to air and the rate of water flow are important design characteristics. To achieve optimal power generation and operations, the amount of water sprayed into air be dependent on multiple factors, which may include, but are not limited to, one or more or a combination of the following: the temperature of the air, the humidity of the air, the specific heat capacity of the air, the density of the air, the air pressure, the flow rate of air, the cross sectional area of air, the residence time of contact between air and water, the surface area to volume ratio of water spray or droplets, the water pumping energy, and the influence of water flow rate on air flow rate.

Note: 'Warm' air may be less dense than 'cold' air due to temperature. Alternatively, or additionally, 'warm' air may be less dense than 'cold' air due to greater humidity, or water vapor concentration, or water vapor partial pressure, or a combination thereof in said 'warm' air. Water vapor has a lower density than gaseous nitrogen and oxygen. Air with a greater partial pressure or concentration of water vapor has a lower density than air with a lesser partial pressure or concentration at the same temperature and total pressure. Air with 100% humidity has a lower density than air with 0% humidity at the same temperature and total pressure. In some embodiments of the present invention, 'warm' air may possess a lower density than 'cold' air due to, for example, including, but not limited to, one or more or a combination of the following: the decrease in density of air with increasing temperature or the decrease in density of air with increasing humidity at the same pressure.

Note: In some embodiments, a liquid may comprise a liquid-solid phase transition material. For example, water may comprise a liquid-solid phase transition material. For example, a liquid-solid phase transition material may comprise, including, but are not limited to, one or more or a combination of the following: water, salt water, or oil, or polymer, or hydroscopic salt, or ionic—water mixture with an overlapping melting point, or sodium sulfate—water, or polyethylene glycol, or glycerol, or ionic liquid, thermoplastic, or resin, or casting mold, or molten metal, or liquid metal. A temperature which a liquid-solid phase transition material transitions from a liquid into a solid may comprise a 'freezing-point'.

Note: A tower may comprise structure or channel or channels or a combination thereof which air passes through, wherein the elevation of where air enters is different from the elevation of where the air exits. Substantially vertical may indication the entering point for air is at a different elevation than the exiting point for air.

Note: In some embodiments, a tower or channel may be constructed on or within a hill or mountain or angled surface.

Specific Embodiments

1. A process for generating power comprising:
   warming a body of air having a temperature lower than the freezing point of water by contacting said body of air with liquid water having a temperature greater than or equal to the freezing point of the liquid water under conditions such that liquid water freezes thereby generating latent heat from freezing and thereby warming the body of air;
   wherein the body of air is within a substantially vertical tower such that the warming the body of air causes the body of air to rise and pass through an air turbine; and
   generating power from the body of air passing through the air turbine.
2. The process of embodiment 1 wherein the body of air has a greater water vapor partial pressure after warming than the water vapor partial pressure before warming.
3. The process of embodiment 1 wherein at least a portion of the liquid water having a temperature greater than or equal to the freezing point of the liquid water comprises liquid water from a water body that is at least partially covered with ice.
4. The process of embodiment 1 wherein the body of air having a temperature lower than the freezing point of water has a temperature lower than −5° C.
5. The process of embodiment 1 wherein said liquid water comprises water from a lake, an ocean, a river, or any combination thereof.
6. The process of embodiment 1 wherein the process further comprises removing one or more obstructions such that at least a portion of the rising body of air continues to pass through the air turbine.
7. The process of embodiment 6 wherein the one or more obstructions comprises frozen liquid water.
8. The process of embodiment 7 wherein frozen liquid water is at least partially removed by thawing.
9. The process of embodiment 7 wherein frozen liquid water is at least partially removed by a mechanical actuator.
10. The process of embodiment 1 wherein said substantially vertical tower and said air turbine are configured to be on a floating structure.
11. The process of embodiment 1 wherein said substantially vertical tower and said air turbine are configured to be on a fixed structure located in a water body.
12. The process of embodiment 1 wherein said substantially vertical tower and said air turbine are configured to be on a fixed structure located on land.
13. The process of embodiment 1 which further comprises transferring at least a portion of generated via a subsea cable.
14. The process of embodiment 1 wherein the air turbine is selected from the group consisting of a Wells turbine, an impulse turbine, a radial turbine, a cross-flow turbine, and a Savonius turbine. Other representative air turbines may be described in, for example, Manabu Takao, Toshiaki Setoguchi, "Air Turbines for Wave Energy Conversion", International Journal of Rotating Machinery, vol. 2012, Article ID 717398, 10 pages, 2012. https://doi.org/10.1155/2012/717398 which is incorporate herein by reference.
15. A process for generating power comprising:
    warming a body of air having a temperature lower than 0° C. by contacting said body of air with liquid water having a temperature greater than or equal to the freezing point of the water under conditions such that liquid water freezes thereby generating latent heat from freezing and thereby warming the body of air;
    passing the warmed body of air through an air turbine; and
    generating power from the body of air passing through the air turbine.
16. The process of embodiment 15 further wherein the air turbine is located within a structure or adjacent a structure.
17. The process of embodiment 16 wherein the structure is a tower or a channel.
18. The process of embodiment 15 wherein the body of air has a greater water vapor partial pressure before warming than the water vapor partial pressure after warming.
19. The process of embodiment 15 wherein at least a portion of the liquid water having a temperature greater than or equal to the freezing point of the water comprises liquid water from a water body that is at least partially covered with ice.
20. The process of embodiment 15 wherein the body of air having a temperature lower than 0° C. has a temperature lower than −5° C.
21. The process of embodiment 15 wherein said air turbine is configured to be on a floating structure.
22. The process of embodiment 1 wherein said substantially vertical tower and said air turbine are configured to be on a fixed structure located in a water body or on land.
23. The process of embodiment 15 which further comprises transferring at least a portion of generated via a subsea cable.

24. A process for generating power comprising:
   passing a body of air having a temperature lower than 0° C. through an air turbine;
   warming the body of air having a temperature lower than 0° C. by contacting said body of air with liquid water having a temperature greater than or equal to the freezing point of the water under conditions such that liquid water freezes thereby generating latent heat from freezing and thereby warming the body of air; and
   generating power from the warmed body of air passing through the air turbine.

25. The process of embodiment 24 wherein the warming the body of air step is conducted while the body of air is passing through an air turbine.

26. The process of embodiment 24 wherein the warming the body of air step is conducted after passing the body of air through the air turbine.

27. The process of embodiment 24 wherein at least a portion of the liquid water having a temperature greater than or equal to the freezing point of the water comprises liquid water from a water body that is at least partially covered with ice.

28. A process for generating power comprising:
   contacting a body of air with a liquid having a freezing point under conditions such that the liquid freezes thereby generating latent heat from freezing and thereby warming the body of air; wherein the body of air is at a temperature less than the freezing point of the liquid prior to contacting;
   passing the warmed body of air through an air turbine; and
   generating power from the body of air passing through the air turbine.

The invention claimed is:

1. A process for generating power comprising:
   warming a body of air having a temperature lower than the freezing point of water by contacting said body of air with liquid water having a temperature greater than or equal to the freezing point of the liquid water under conditions such that liquid water freezes thereby generating latent heat from freezing and thereby warming the body of air;
   wherein the body of air is within a substantially vertical tower having a base such that the warming the body of air causes the body of air to rise and pass through an air turbine; and
   generating power from the body of air passing through the air turbine; wherein the air turbine is located at the base of the substantially vertical tower.

2. The process of claim 1 wherein the body of air has a greater water vapor partial pressure after warming than the water vapor partial pressure before warming.

3. The process of claim 1 wherein at least a portion of the liquid water having a temperature greater than or equal to the freezing point of the liquid water comprises liquid water from a water body that is at least partially covered with ice.

4. The process of claim 1 wherein the body of air having a temperature lower than the freezing point of water has a temperature lower than −5° C.

5. The process of claim 1 wherein said liquid water comprises water from a lake, an ocean, a river, or any combination thereof.

6. The process of claim 1 wherein the process further comprises removing one or more obstructions such that at least a portion of the body of air continues to pass through the air turbine.

7. The process of claim 6 wherein the one or more obstructions comprises frozen liquid water.

8. The process of claim 7 wherein frozen liquid water is at least partially removed by thawing.

9. The process of claim 7 wherein frozen liquid water is at least partially removed by a mechanical actuator.

10. The process of claim 1 wherein said substantially vertical tower and said air turbine are configured to be on a floating structure.

11. The process of claim 1 wherein said substantially vertical tower and said air turbine are configured to be on a fixed structure located in a water body.

12. The process of claim 1 wherein said substantially vertical tower and said air turbine are configured to be on a fixed structure located on land.

13. The process of claim 1 which further comprises transferring at least a portion of generated power via a subsea cable.

14. The process of claim 1 wherein the air turbine is selected from the group consisting of a Wells turbine, an impulse turbine, a radial turbine, a cross-flow turbine, and a Savonius turbine.

15. A process for generating power comprising:
   warming a body of air having a temperature lower than 0° C. by contacting said body of air with liquid water having a temperature greater than or equal to the freezing point of the water under conditions such that liquid water freezes thereby generating latent heat from freezing and thereby warming the body of air;
   passing the warmed body of air through an air turbine; and
   generating power from the body of air passing through the air turbine wherein the air turbine is located at a base of a substantially vertical tower.

16. The process of claim 15 further wherein the air turbine is located within a structure or adjacent a structure.

17. The process of claim 16 wherein the structure is a tower or a channel.

18. The process of claim 15 wherein the body of air has a greater water vapor partial pressure before warming than the water vapor partial pressure after warming.

19. The process of claim 15 wherein at least a portion of the liquid water having a temperature greater than or equal to the freezing point of the water comprises liquid water from a water body that is at least partially covered with ice.

20. The process of claim 15 wherein the body of air having a temperature lower than 0° C. has a temperature lower than −5° C.

21. The process of claim 15 wherein said air turbine is configured to be on a floating structure.

22. The process of claim 1 wherein said substantially vertical tower and said air turbine are configured to be on a fixed structure located in a water body or on land.

23. The process of claim 15 which further comprises transferring at least a portion of generated power via a subsea cable.

24. A process for generating power comprising:
   passing a body of air having a temperature lower than 0° C. through an air turbine;
   warming the body of air having a temperature lower than 0° C. by contacting said body of air with liquid water having a temperature greater than or equal to the freezing point of the water under conditions such that liquid water freezes thereby generating latent heat from freezing and thereby warming the body of air; and
   generating power;
   wherein the air turbine is located at a base of a substantially vertical tower.

25. The process of claim 24 wherein the warming the body of air step is conducted while the body of air is passing through an air turbine.

26. The process of claim 24 wherein the warming the body of air step is conducted after passing the body of air through the air turbine.

27. The process of claim 24 wherein at least a portion of the liquid water having a temperature greater than or equal to the freezing point of the water comprises liquid water from a water body that is at least partially covered with ice.

28. A process for generating power comprising:
contacting a body of air with a liquid having a freezing point under conditions such that the liquid freezes thereby generating latent heat from freezing and thereby warming the body of air; wherein the body of air is at a temperature less than the freezing point of the liquid prior to contacting;
passing the warmed body of air through an air turbine; and
generating power from the body of air passing through the air turbine; 'wherein the air turbine is located at a base of a substantially vertical tower.

* * * * *